(No Model.)
E. HUBER.
LUBRICATOR.
No. 553,853. Patented Feb. 4, 1896.
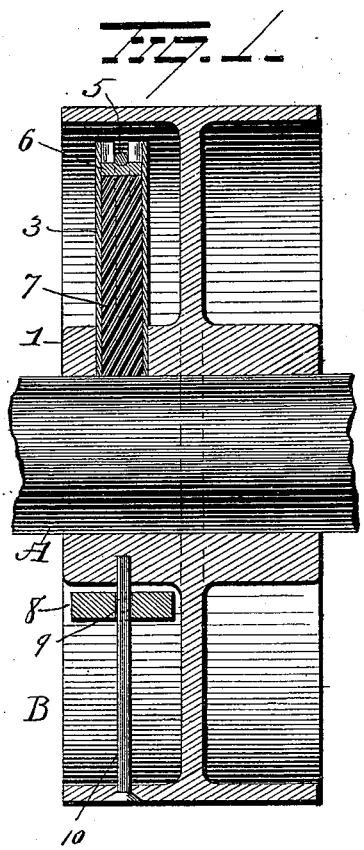
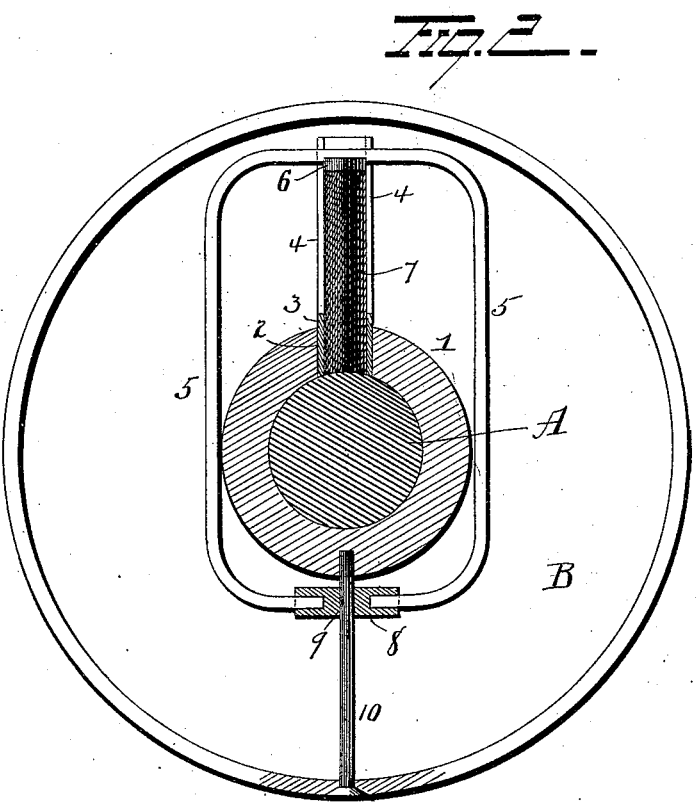
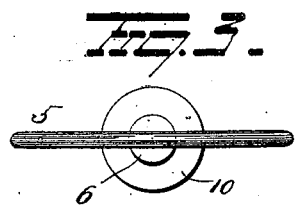
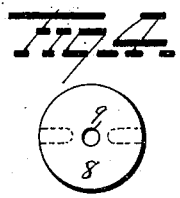
Witnesses
E. J. Nottingham
G. F. Downing
Inventor
Edward Huber
By M. D. Leggett & Co
Attorneys

UNITED STATES PATENT OFFICE.

EDWARD HUBER, OF MARION, OHIO.

LUBRICATOR.

SPECIFICATION forming part of Letters Patent No. 553,853, dated February 4, 1896.

Application filed November 19, 1895. Serial No. 569,448. (No model.)

*To all whom it may concern:*

Be it known that I, EDWARD HUBER, of Marion, in the county of Marion and State of Ohio, have invented certain new and useful Improvements in Lubricators; and I do hereby declare the following to be a full, clear, and exact description of the invention, such as will enable others skilled in the art to which it appertains to make and use the same.

My invention relates to an improvement in lubricators, the object of the invention being to produce a lubricator for pulleys, &c., which shall be simple in construction and effectual in all respects in the performance of its functions.

With this object in view the invention consists in certain novel features of construction and combinations and arrangements of parts, as hereinafter set forth, and pointed out in the claims.

In the accompanying drawings, Figure 1 is a sectional view of a pulley, showing the application of my improvements thereto. Fig. 2 is a face view of a pulley having my improvements attached thereto. Figs. 3 and 4 are detail views.

A represents a shaft, and B a pulley mounted loosely thereon. The hub 1 of the pulley is made with a hole 2, in which a tubular lubricant-chamber 3 is secured, the wall of said tubular chamber being slotted, as at 4, at diametrically-opposite points for the accommodation of the arms of a bail or yoke 5. The bail or yoke 5 is secured to a plunger 6 in the lubricant-chamber and said plunger bears against the lubricant 7, which latter is preferably solid. The bail or yoke 5 encompasses the hub 1 and the free ends of the arms of said yoke are secured to a weight 8 at a point diametrically opposite the lubricant-chamber. The weight is provided with a central hole, 9, for the accommodation of a rod 10, on which said weight is adapted to move, said rod or guide 10 being secured to the hub or rim of the pulley, or both, preferably exactly in line with the lubricant-chamber.

From the construction and arrangement of parts above described it will be seen that when the pulley is in motion the effect of the centrifugal force of the weight 8 will be to exert a pressure against the lubricant through the medium of the yoke or bail and the plunger attached thereto and maintain said lubricant constantly in intimate contact with the shaft on which the pulley is rotating.

My improvements are very simple in construction, comparatively cheap to manufacture, and effectual in all respects in the performance of their functions.

Slight changes might be made in the details of construction of my invention without departing from the spirit thereof or limiting its scope, and hence I do not wish to limit myself to the precise details herein set forth; but, Having fully described my invention, what I claim as new, and desire to secure by Letters Patent, is—

1. The combination with a wheel or pulley and a lubricant-chamber carried thereby, a plunger in said lubricant-chamber, a yoke to which said plunger is connected and a weight connected to said yoke, whereby the centrifugal force of said weight will be transmitted to the plunger through the medium of the yoke, substantially as set forth.

2. The combination with a wheel or pulley and a lubricant-chamber having slots, secured to said wheel or pulley, of a plunger in the lubricant-chamber and adapted to bear against the lubricant therein, a yoke by which said plunger is carried, said yoke being adapted to encompass the hub of the wheel or pulley and operate in the slots in the lubricant-chamber, and a weight secured to said yoke, substantially as set forth.

3. The combination with a wheel or pulley, of a lubricant-chamber secured thereto, a plunger in said lubricant-chamber, a yoke to which said plunger is secured, a weight secured to the arms of said yoke and having a hole therein, and a guide-rod secured to the pulley diametrically opposite the lubricant-chamber and passing through the hole in the weight, for which latter it serves as a guide, substantially as set forth.

In testimony whereof I have signed this specification in the presence of two subscribing witnesses.

EDWARD HUBER.

Witnesses:
JOHN J. CRAWLEY,
JOHN A. SCHRODER.